United States Patent [19]

Lykes

[11] 4,293,114
[45] Oct. 6, 1981

[54] FLEXIBLE MOTOR MOUNTING

[75] Inventor: Robert E. Lykes, Troy, Ohio

[73] Assignee: A. O. Smith Corporation, Milwaukee, Wis.

[21] Appl. No.: 950,152

[22] Filed: Oct. 10, 1978

[51] Int. Cl.³ .......................................... F16M 13/00
[52] U.S. Cl. .................................. 248/604; 248/612; 248/672
[58] Field of Search ............... 248/560, 603, 604, 605, 248/606, 610, 611, 612, 672

[56] References Cited

U.S. PATENT DOCUMENTS

| | | | |
|---|---|---|---|
| 697,020 | 4/1902 | Rowland | 16/172 |
| 1,435,763 | 11/1922 | Townsend | 248/603 X |
| 1,860,883 | 5/1932 | Bilde | 248/603 X |
| 2,063,063 | 12/1936 | Trott et al. | 248/605 |
| 2,459,692 | 1/1949 | Fletcher | 248/300 |
| 2,936,140 | 5/1960 | Copeland | 248/604 |
| 3,508,729 | 4/1970 | Wilson | 248/604 |
| 3,773,285 | 11/1973 | Morrill | 248/603 |

FOREIGN PATENT DOCUMENTS 691231 5/1953 United Kingdom ............... 248/603

Primary Examiner—William H. Schultz
Attorney, Agent, or Firm—Andrus, Sceales, Starke & Sawall

[57] ABSTRACT

A flexible vibration dampening mounting assembly for supporting an electric motor within a blower housing. The flexible mounting is normally provided as part of the electric motor and consists of a plurality of circumferentially spaced hardened steel mounting arms which are joined to the motor main frame by a hinge connection which permits attachment of the hardened steel mounting arms to the hinge pins previously welded to the main frame and thus eliminates the possibility of embrittlement of the mounting arms due to heat generated during welding operations.

7 Claims, 7 Drawing Figures

FLEXIBLE MOTOR MOUNTING

BACKGROUND OF THE INVENTION

Various constructions have been previously used to absorb the torque vibrations of a motor when the main frame of the motor is connected to a blower housing. Recent United States patents in this field are U.S. Pat. Nos. 4,063,060 and 4,076,197. The present invention overcomes the problem of embrittlement of the mounting arms supporting the motor on the blower housing because welding of each arm itself is eliminated.

SUMMARY OF THE INVENTION

The invention is directed to a flexible vibration dampening assembly for securing an electric motor to the housing of a direct drive blower of fan units. The assembly is directed to a plurality of circumferential spaced hardened steel mounting arms extending from the main frame of the motor and each having a pad at the outer end with openings therein to secure the arms to the housing.

A hook or loop is provided at the inner end of each arm and each hook is snapped or latched over a hinge pin which has been previously secured to the main frame of the motor in slightly spaced relation from the surface of the main frame so that the hook can be readily received by the hinge pin and be free to rotate on the hinge pin. Under one embodiment the hinge pin is provided by welding the pin at both ends to the main frame with the central part of the pin slightly spaced from the surface of the main frame and the ends of the pin preventing longitudinal movement of the hook on the respective arms. In a second embodiment the hinge pin is welded to the main frame at only one end which provides an abutment at that end of the pin and has an abutment at the other end with the abutments preventing longitudinal movement of the hook on the inner end of the respective arms. In a third embodiment the hinge pin is provided as an integral part of the main frame and is held against longitudinal movement.

The arms are formed from generally thin steel which provides flexibility and are heat treated to provide the necessary strength required for shipping and handling and resistance to fatigue due to flexing.

DETAILED DESCRIPTION OF THE INVENTION

Figure 1:
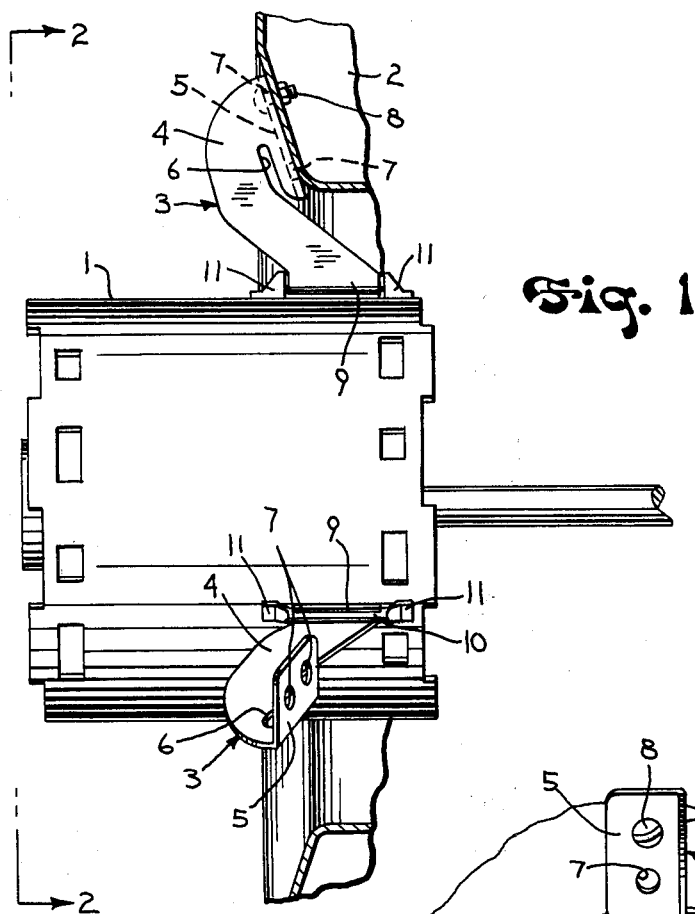
FIG. 1 is a side elevational view of the motor illustrating a plurality of arms hinge connected to the main frame of the motor and with one of the arms shown as secured to a housing.

Referring to the drawings there is shown as the best mode of the invention an electric motor having a main frame 1 which is supported within the housing 2 by a plurality of circumferentially spaced mounting assemblies 3.

Each mounting assembly 3 has a mounting arm 4 which extends in an angular manner outwardly from frame 1 and at the outer end turns toward housing 2 and terminates in a flat support pad 5. This construction incorporates a notch 6 in the mounting arm 4 behind pad 5 which provides flexibility to the respective arms 4.

Pad 5 normally has two bolt holes 7 for use in securing the arm 4 to housing 2 but in the drawings only one hole is used through which extends bolt 8 and through mating holes in housing 2 to secure the mounting assemblies 3. Notch 6 incorporated in mounting arm 4 behind support pad 5 provides equal flexibility of mounting arm 4 regardless of the mounting bolt circle diameter of bolt 8. Without notch 6, the smaller the bolt circle diameter of bolt 8, the less flexible is mounting arm 4, and the notch overcomes this problem.

The inner end of each arm 4 is provided with loop or hook 9.

Mounting assembly 3 of the first embodiment as illustrated in FIGS. 1-4 of the drawings is completed by the hinge pin 10 which centrally is slightly spaced from frame 1 to receive hook 9 which is snapped over pin 10. The opposite supporting ends 11 of the hinge pin assembly lie in engagement with main frame 1 and are welded to frame 1 as by projection welds 12.

Mounting arms 4 are formed of relatively thin steel which provides flexibility and are heat treated to provide the necessary strength required for shipping and handling and resistance to fatigue due to flexing. Hinge pin 10 is cold formed and normally is made of low carbon header wire which provides an excellent condition for resistance or projection welding to the low carbon main frame.

Hinge pin 10 is so designed to easily rest in the cavity of a welding pad of a projection welder, not shown, and does not require any complex fixturing to locate and secure for welding.

The diameter of the pin and hook or loop on the lower end of the arm 4 and the opening of loop or hook 9 are critical because the loop 9 must not be overstressed and result in a loose assembly. Experimentation has determined that the proper diameter fit between loop or hook 9 and hinge pin 10 should be of the order of 0.002 of an inch loose to about 0.002 of an inch interference and that the opening of the loop or hook 9 should be of the order of 90% of the nominal diameter of hinge pin 10.

By hinging arms 4 to the frame 1 through the hooks 9 and hinge pin 10, this permits arms 4 to be rotated on hinge pin 10 to align the bolt holes 7 with the mounting holes of housing 2.

The principal advantage of the hinged connection is that it permits the attachment of the generally thin heat treated steel mounting arms 4 to the main frame 1 of the electric motor so as to completely eliminate the possibility of embrittlement of the mounting arms 4 due to heat generated by a welding operation because as in the first embodiment the hinge pin has previously been welded to frame 1.

Figure 5:
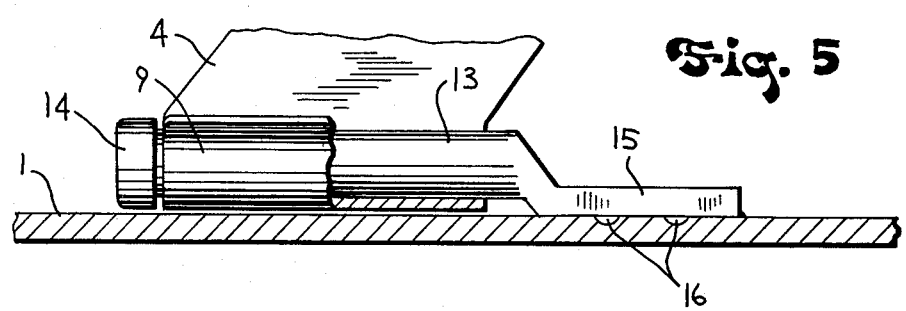
FIG. 5 is a detail view with parts in section of a second embodiment of the invention.
Figure 6:
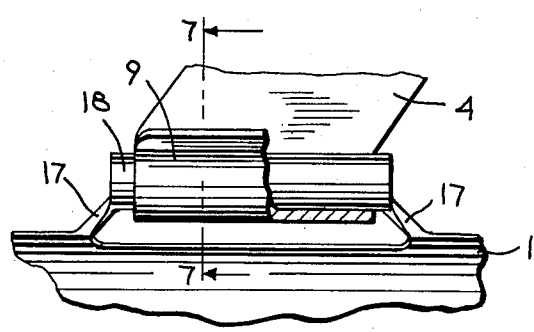
FIG. 6 is a detail view of a third embodiment of the invention.
Figure 7:
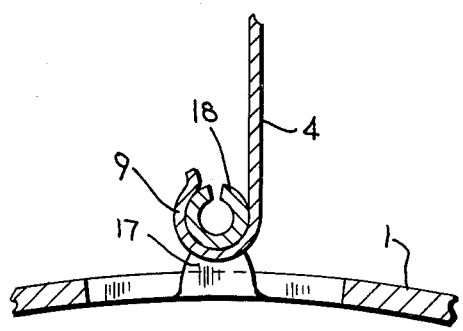
FIG. 7 is a section taken on line 7—7 of FIG. 6.

The above advantages are also present in the second embodiment of the invention shown in FIG. 5 and in the third embodiment illustrated in FIGS. 6 and 7.

In FIG. 5 the hinge pin 13 is spaced from frame 1 to receive the hook 9 of arm 4 and terminates in an abutment 14 at one end also spaced from the main frame and in an elongated supporting extension 15 at the other end. The latter engages main frame 1 and is joined thereto by a pair of welds 16.

In the third embodiment shown in FIGS. 6 and 7, welds are completely eliminated and the hinge pin assembly is formed integrally with the main frame 1. Frame 1 is formed outwardly with the longitudinally spaced upstanding projections 17 which support therebetween the integrally formed hinge pin 18 formed from main frame 1 and spaced upwardly from the frame to receive the hook 9 of an arm 4.

Figure 2:
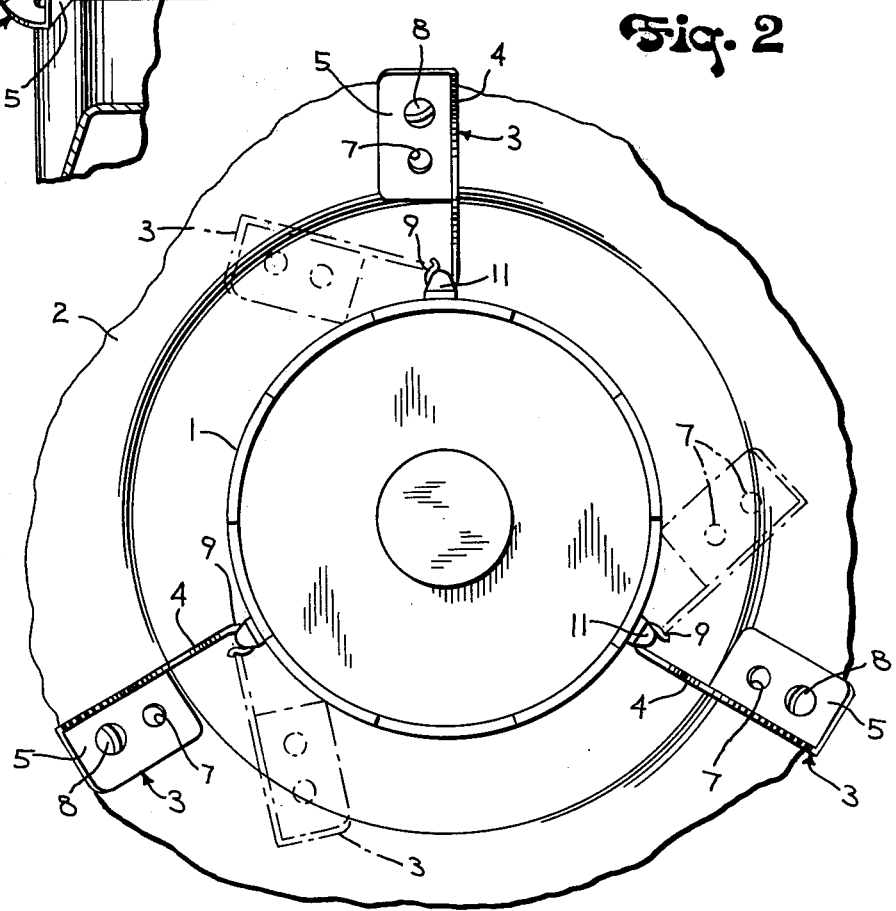
FIG. 2 is a section taken on line 2—2 of FIG. 1.
Figure 3:
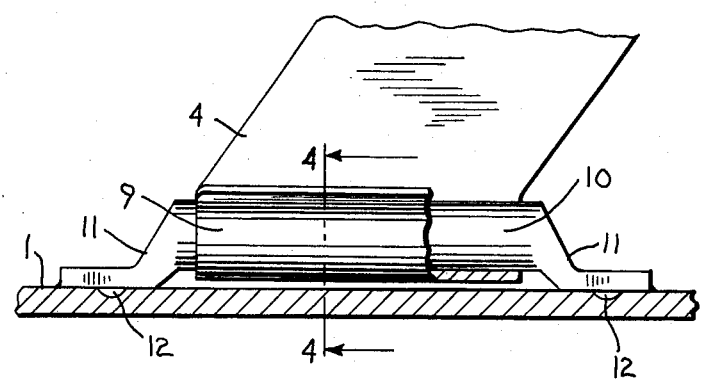
FIG. 3 is a detail view with parts in section of the preferred embodiment of the invention.
Figure 4:
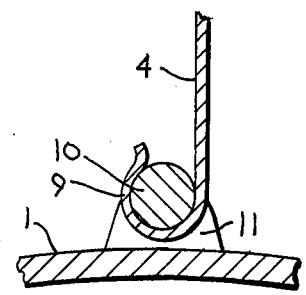
FIG. 4 is a section taken on line 4—4 of FIG. 3.

The many advantages of the various embodiments of the invention have been set forth in connection with the first embodiment, but one additional advantage of importance is that the hinged support of the arms of the mounting assemblies requires less packing space than a motor with rigidly mounted arms, as can be noted in FIG. 2 where the arms 4 are shown in phantom in folded position. It has been found that rigid arms supported on the main frame of the motor require on the order of 30% more space than the hinged concept.

Various modes of carrying out the invention are contemplated as being within the scope of the following claims particularly pointing out and distinctly claiming the subject matter which is regarded as the invention.

I claim:

1. A flexible vibration dampening assembly for securing an electric motor having a main frame to a housing having bolt hole means therein to receive bolts and the dampening assembly being adapted to lie against the motor frame during shipping of the motor, which comprises at least one mounting arm of generally thin heat treated steel extending from the main frame of the motor, an elongated hook disposed at the inner end of the arm with the axis of said hook being generally parallel to the axis of the motor, a mounting pad having bolt holes therein secured to the outer end of the arm and extending circumferentially of the axis of the motor, and a cold formed non-rotatable hinge pin fixed to the main frame of the motor prior to assembly of the mounting arm with the hinge pin and in slightly spaced relation therefrom, and the hook at the inner end of the arm being of substantially the same length as the hinge pin and latched over the hinge pin to secure the inner end of the arm to the latter but permitting rotation of the hinge pin to line up at least one bolt hole in the pad with the bolt hole means in the housing to receive a bolt to secure the mounting arm and housing together and at the same time permit the attachment of the generally thin heat treated steel mounting arm to the frame of the electric motor so as to completely eliminate the possibility of embrittlement of the mounting arm due to heat generated by a welding operation.

2. The flexible vibration dampening assembly of claim 1, and the opening of the hook being of the order of about 90% of the nominal diameter of the hinge pin to provide a proper fit of the pin in the hook with respect to interference and looseness.

3. The flexible dampening assembly of claim 1, and the diameter fit between the hook and hinge pin is of the order of 0.002 of an inch loose to about 0.002 of an inch interference.

4. The flexible vibration dampening assembly of claim 1 and the hinge pin terminating in end portions extending from the pin at a lower level in engagement with the main frame, and at least one weld securing the end portions to the main frame of the motor.

5. The flexible vibration dampening assembly of claim 1 and the hinge pin terminating in an abutment at one end and having an elongated supporting extension at the other end, and at least one weld securing the supporting extension to the main frame of the motor.

6. The flexible vibration dampening assembly of claim 1 and the hinge pin formed as an integral part of the main frame, and upstanding projections on the main frame formed integrally with the hinge pin and supporting the hinge pin slightly spaced above the main frame.

7. The flexible vibration dampening assembly of claim 1, and the mounting arm at the area behind the pad incorporating a notch to provide equal flexibility of the mounting arm regardless of the mounting bolt circle diameter.

* * * * *